United States Patent [19]

Ilchuk

[11] Patent Number: 5,217,274
[45] Date of Patent: Jun. 8, 1993

[54] TREE MOVER

[76] Inventor: John Ilchuk, P.O. Box 852, Vermilion, Alberta, Canada, T0B 4M0

[21] Appl. No.: 766,277

[22] Filed: Sep. 27, 1991

[51] Int. Cl.$^5$ .............................................. B66C 3/16
[52] U.S. Cl. .................................. 294/68.23; 294/88; 414/625
[58] Field of Search ............... 294/68.23, 88; 414/624, 414/625; 37/2 R, 183 R, 186, 187, 188; 172/233

[56] References Cited

U.S. PATENT DOCUMENTS

| | | | |
|---|---|---|---|
| 2,007,704 | 7/1935 | Botten | 37/186 |
| 2,499,433 | 3/1950 | Waite et al. | |
| 2,889,643 | 6/1959 | Chatrenet | |
| 2,890,806 | 6/1959 | Pilch | 294/68.23 X |
| 3,627,371 | 12/1971 | Billings | 37/187 X |
| 3,641,689 | 2/1972 | Billings | 37/187 |
| 3,772,806 | 11/1973 | Meadows | 37/187 X |
| 3,977,099 | 8/1976 | Stewart | 37/2 R |
| 4,005,894 | 2/1977 | Tucek | 294/88 |
| 4,071,155 | 1/1978 | Hart et al. | 37/187 X |
| 4,497,608 | 2/1985 | Sheppard et al. | 414/624 X |
| 4,573,862 | 3/1986 | Anderson | 294/88 X |
| 4,602,444 | 7/1986 | Endo | 37/2 R |
| 4,676,013 | 6/1987 | Endo | 37/2 R |

FOREIGN PATENT DOCUMENTS

| | | | |
|---|---|---|---|
| 1035204 | 7/1978 | Canada | 111/2 |
| 204459 | 11/1983 | Fed. Rep. of Germany | 294/68.23 |
| 3245673 | 1/1984 | Fed. Rep. of Germany | 294/68.23 |
| 1366036 | 6/1964 | France | 294/68.23 |
| 1377486 | 9/1964 | France | 294/68.23 |

Primary Examiner—Russell D. Stormer
Assistant Examiner—Dean Kramer
Attorney, Agent, or Firm—Stevens, Davis, Miller & Mosher

[57] ABSTRACT

This invention relates to a tree mover for relocating small trees. The tree mover is designed to dig a hole to receive a tree, dig up a tree and deposit the tree in the hole. The tree mover includes a supporting frame for attachment to a tractor, shafts pivotally mounted on the frame and a loading bucket mounted on the shafts. A crank arm is connected to each of the shafts and is linked to a double crank to bias the loader buckets to an open or closed position, as a consequence of the rotation of the double crank. The double crank is hydraulically controlled.

4 Claims, 2 Drawing Sheets

TREE MOVER

This invention relates to a tree mover for relocating small trees.

An object of this invention is to provide a tree mover which is adapted to dig a hole to receive a tree, dig up a tree and deposit such tree in the hole.

A further object is to provide a tree mover with a simple rugged mechanism.

A further object of this invention in its preferred embodiment is to provide a tree mover, the working parts of which can readily be disassembled for repair.

A further object of this invention in its preferred embodiment is to provide a tree mover including provision against damage to its mechanism if an obstruction is encountered.

In accordance with this invention the foregoing and other objects are achieved by providing a tree mover comprising a supporting frame adapted for attachment at its rear end to a tractor, a pair of spaced forwardly extending shafts pivotally mounted on said frame, a loader bucket having a cutting edge at its bottom mounted at its upper end on each of said shafts, a crank arm connected to each of said shafts, a link joining each of said crank arms to an arm of a double crank, so that rotation of the double crank in one direction biases the loader buckets towards each other to a closed position and rotation of the double crank in an opposite direction biases the loading buckets away from each other to an open position, a double acting hydraulic means for rotating said double crank in said one direction or the opposite direction and means for raising said loader buckets and for lowering them to impart downward pressure from the weight of said tractor.

In accordance with a preferred embodiment the tree mover has a cylinder bracket for mounting one end of the double acting hydraulic cylinder on the frame and a crank arm joined to the other end of said hydraulic cylinder, and a shaft connecting the last mentioned crank arm to the double crank.

Preferably the crank arm has two parts, one part being fixed to the shaft that connects it to the double crank and the second part being mounted for rotation on said shaft and a shear pin joining the two parts, to protect the mechanism if a rock obstructs the closing of the loading buckets.

The supporting frame is preferably a C frame with braced upright frame members at its rearward end. Connecting members are pivotally joined to the lower portions of the upright frame members and connected to the tractor and in which a double acting hydraulic cylinder is connected between an upper portion of an upright frame member to raise or lower said loading buckets.

The shaft supporting the buckets and the double crank are each mounted on brackets removable for disassembly.

In the drawings which illustrate the preferred embodiment of this invention;

Figure 1:
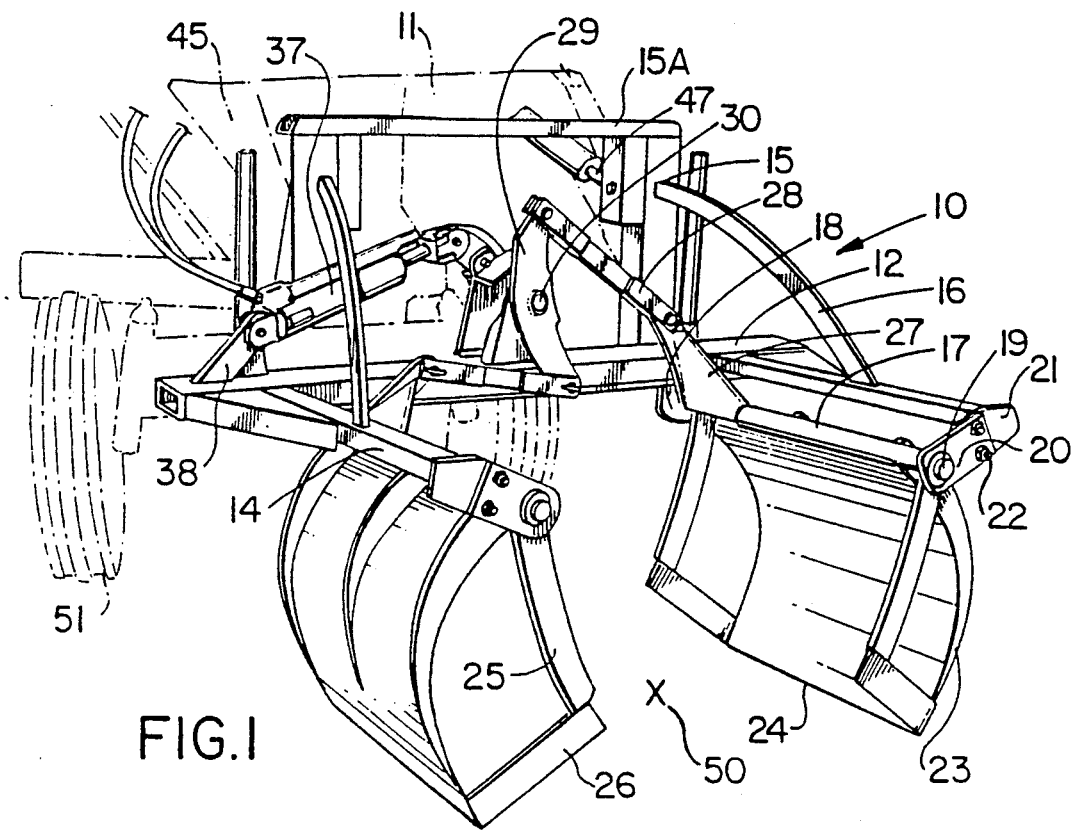
FIG. 1 is a front perspective view of the tree mover showing the buckets in open position.

The drawings illustrate a tree mover generally indicated by the number 10 mounted at the front of a tractor 11. The tree mover comprises a generally C frame 12 consisting of transverse frame member 13 at each end of which is connected longitudinal frame members 14. At the rearward end of frame 12 there are upright frame members 15, the tops of which are joined by crosspiece 15A. Braces 16 are connected between upright frame members 15 and longitudinal frame members 14.

Shafts 17 have bearings 18 located on the underside of transverse member 13 and bearings 19 mounted on linkage arms 20 which are joined to plates 21 at the ends of longitudinal frame members 14 by bolts 22. Buckets 23 are mounted on shafts 17 and have cutting edges 24 at their bottoms. Buckets 23 include also lateral brace members 25 and 26. Buckets 23 can easily be removed for repair by removing bolts 22, and linkage arms 20, together with bearing 19, and sliding shafts 17 forward out of bearings 18.

Each of shafts 17 has a crank arm 27 at its forward end. Links 28 joins each of crank arms 27 to an arm of a double crank 29 so that rotation of double crank 29 in one direction biases loader buckets 23 towards each other to a closed position and rotation of the double crank 29 in an opposite direction biases the loader buckets away from each other to an open position.

Figure 4:
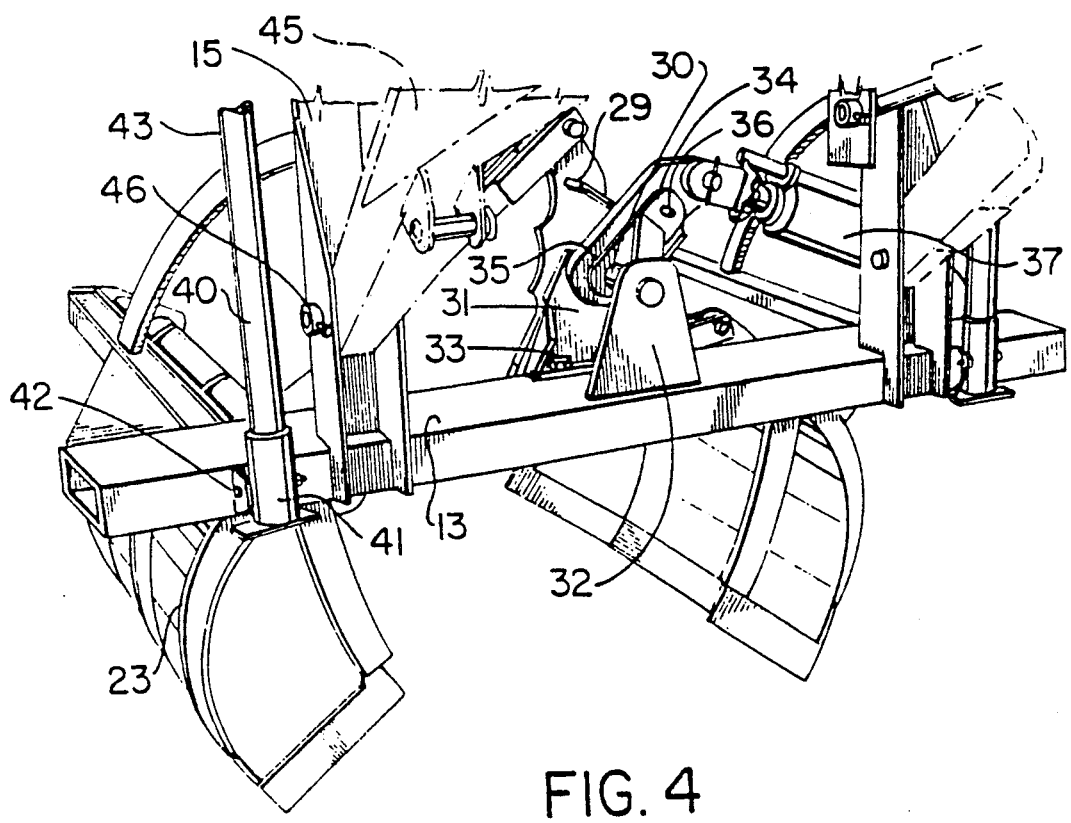
FIG. 4 is a back perspective view illustrating part of the tree mover shown in FIGS. 1 to 3.

Double crank 29 is mounted on crank shaft 30 which as best shown in FIG. 4, is supported by brackets 31 and 32. Bracket 31 is L-shaped and bolted by bolts 33 to transverse frame 13 so that the lever mechanism can be disassembled by removing bolts 33.

Link 34 is rigidly mounted, such as by welding, to crank shaft 30. Link 35 is loosely mounted on crank shaft 30. Shear pin 36 connects links 34 and 35. Double acting hydraulic cylinder 37 extends between link 35 and a supporting bracket 38 on frame member 13. Hydraulic cylinder 37 therefore acts through links 34 and 35 and double crank 29 to open and close buckets 23. Shear pin 36 protects the mechanism in the event of an obstruction such as a boulder.

A storage stand is provided by upright members 40 slidable in sleeves 41 which are joined to transverse frame 13. Pins 42 engage holes 43 to hold member 40 in an appropriate position for storage. The tree mover 10 is linked to tractor 11 by connecting members 45 which extend upwardly and rearwardly from the lower parts of upright members 15 to which they are pivotally joined by pins 46. Members 45 are secured to the tractor at their other ends. A double acting hydraulic cylinder 47 is connected between an upper part of upright member 15 and the tractor so that actuating cylinder 47 causes buckets 23 to be raised or lowered between a position in which buckets 23 are above ground level and a position in which they are below ground level. Connecting members 45 have bracing members 48, because of the stress to which they will be subjected by the action described below.

Figure 2:
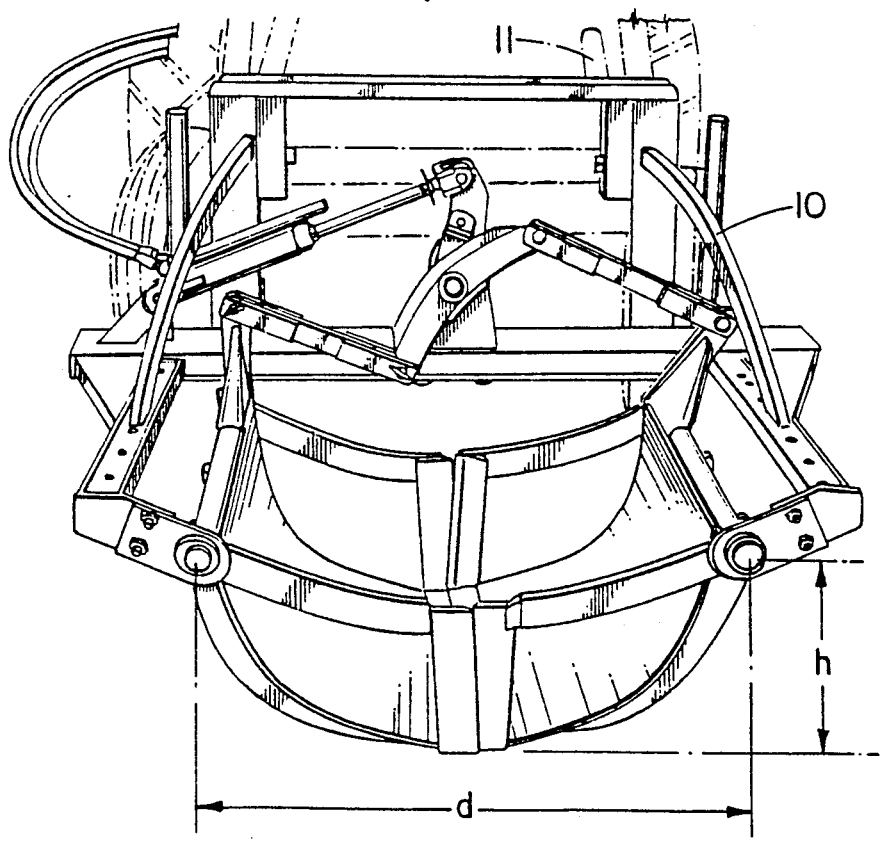
FIG. 2 is a front perspective view of the tree mover showing the buckets in closed position.
Figure 3:
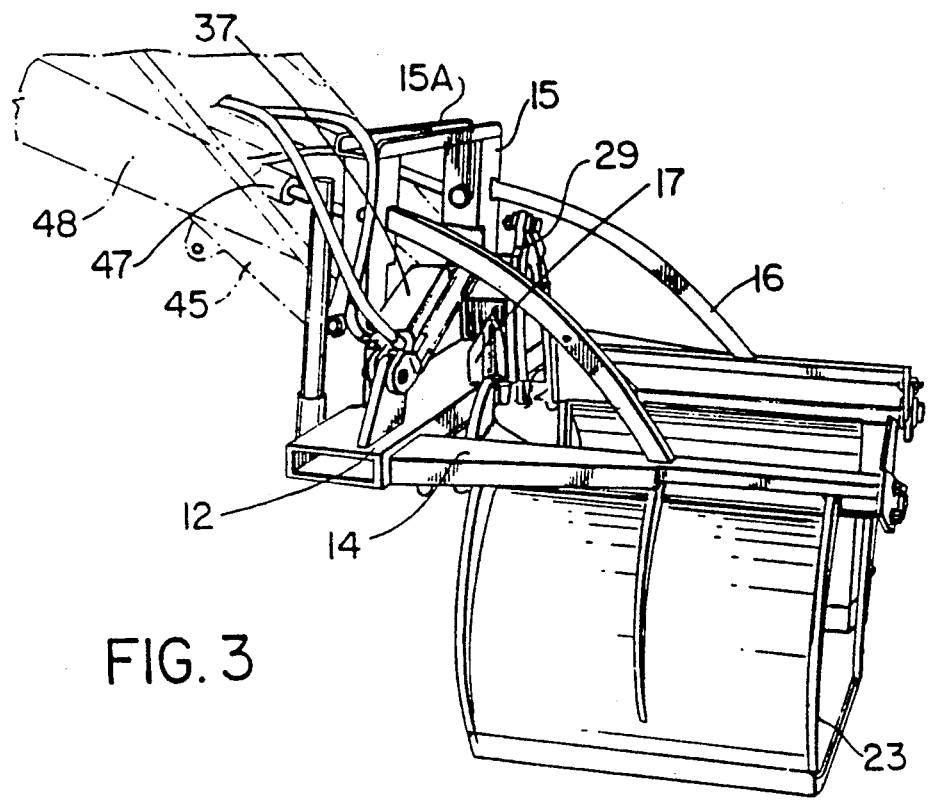
FIG. 3 is a side perspective view of the tree mover illustrated in FIGS. 1 and 2.

To operate the tree mover it is positioned with the buckets 23 in an open position as shown in FIG. 1, each to one side of the spot marked X and indicated by the numeral 50 where a tree is to be planted. Pressure is exerted downwardly by hydraulic loader cylinder 47 lifting most of the weight off the front wheels 51 of the tractor. Hydraulic cylinder 37 is then actuated to move the buckets 23 to the closed position of FIG. 2. Under normal conditions it should be possible to cut a hole about 18" deep by 36" square at the top where dimension h in FIG. 2 is 18" and dimension d is 36".

The soil in buckets 23 is removed to a remote location. If, however, it is desired to save some of the top soil to fill in holes and air spaces around the tree after the tree is set in the hole, successive cuts are made. The first cut may be 8" to 10" deep to remove and retain the top soil. The depth of cut is regulated by the downward pressure applied by the loader cylinder 47.

The tree mover is located in the position of FIG. 1 with the tree at location X, downward pressure is exerted and the tree with its adjacent roots and surrounding earth is scooped up. Sometimes it is necessary to rock the cutting blades backwards and forwards as downward pressure is applied and the blades 24 of the buckets 23 are brought together. This may be required to cut through thick roots, hard clay and gumbo soil.

The tree is then positioned over the hole that has previously been dug. It is lowered into the hole and levelled by controlling the bucket cylinder. The blades are then opened and at the same time lifted to remove them.

I claim:

1. A tree mover comprising a generally C shaped supporting frame with braced upright frame members at its rearward end, said supporting frame being adapted for attachment at its rear end to the front of a tractor, a pair of spaced forwardly extending shafts pivotally mounted on said frame, a loader bucket having a cutting edge at its bottom mounted at its upper end on each of said shafts for rotation about a substantially horizontal axis, a crank arm connected to each of said shafts, a link joining each of said crank arms to an arm of a double crank which is mounted for rotation about a substantially horizontal axis so that rotation of the double crank in one direction biases the loader buckets towards each other in unison to a closed position and rotation of the double crank in an opposite direction biases the loader buckets away from each other in unison to an open position, a double acting hydraulic cylinder for rotating said double crank in one direction or the opposite direction and means for raising said loader buckets and lowering them below ground level to lift most of the weight of the front of the tractor off the ground so as to impart downward pressure for digging from the weight of said tractor forcing said cutting edges into the ground.

2. A tree mover as in claim 1 in which connecting members are pivotally joined to the lower portions of the upright frame members and connected to the tractor and in which a double acting hydraulic cylinder is connected between an upper portion of an upright frame member to raise or lower said loading buckets.

3. A tree mover comprising a supporting frame adapted for attachment at its rear end to a tractor, a pair of spaced forwardly extending shafts pivotally mounted on said frame, a loader bucket having a cutting edge at its bottom mounted at its upper end on each of said shafts, a crank arm connected to each of said shafts, a link joining each of said crank arms to an arm of a double crank so that rotation of the double crank in one direction biases the loader buckets towards each other in unison to a closed position and rotation of the double crank in an opposite direction biases the loader buckets away from each other in unison to an open position, double acting hydraulic means for rotating said double crank in said one direction or the opposite direction and means for raising said loader buckets and for lowering them to impart downward pressure from the weight of said tractor, having a cylinder bracket for mounting one end of the double acting hydraulic means on the frame and a crank arm joined to the other end of said double acting hydraulic means, a shaft connecting the last mentioned crank arm to the double crank, said last mentioned crank arm having two parts, one part being fixed to the shaft that connects it to the double crank and the second part being mounted for rotation on said shaft and a shear pin joining the two parts, to protect the mechanism if a rock obstructs the closing of the loading buckets.

4. A tree mover comprising a supporting frame extending from the front of a tractor, a pair of forwardly extending shafts pivotally mounted on said frame, a loader bucket having a cutting edge at its bottom mounted at its upper end on each of said shafts for rotation about a substantially horizontal axis, a crank arm connected to each of said shafts, a link joining each of said crank arms to an arm of a double crank which is mounted for rotation about a substantially horizontal axis so that rotation of the double crank in one direction biases the loader buckets towards each other in unison to a closed position, and rotation of the double crank in an opposite direction biases the loader buckets away from each other in unison to an open position, a shaft upon which the double crank is mounted, a crank arm for connection to a hydraulic cylinder mounted on said shaft upon which the double crank is mounted, and a double acting hydraulic cylinder connected to the crank arm for connection to it for rotating said double crank in one direction or the opposite direction, means for raising said loader buckets and for lowering them to impart downward pressure, a crank arm mounted on said shaft upon which the double crank is mounted, and a double acting hydraulic cylinder connected to the last mentioned crank arm for rotating it in one direction or an opposite direction and means for raising said loader buckets and for lowering them below ground to lift most of the weight of the front of the tractor off the ground so as to impart downward pressure for digging from the weight of said tractor forcing the cutting edges into the ground, at least one of said crank arms being in two parts, one fixed to a shaft upon which the last mentioned crank arm is mounted and the second part being mounted for rotation on the last mentioned shaft, a shear pin joining the two parts to protect the mechanism if a rock obstructs the closing of the loading buckets.

* * * * *